(12) United States Patent
Farr et al.

(10) Patent No.: US 7,220,380 B2
(45) Date of Patent: May 22, 2007

(54) SYSTEM AND METHOD FOR FABRICATING A THREE-DIMENSIONAL METAL OBJECT USING SOLID FREE-FORM FABRICATION

(75) Inventors: Isaac Farr, Corvallis, OR (US); Terry M. Lambright, Corvallis, OR (US); Daniel A. Kearl, Philomath, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 487 days.

(21) Appl. No.: 10/686,263

(22) Filed: Oct. 14, 2003

(65) Prior Publication Data

US 2005/0079086 A1    Apr. 14, 2005

(51) Int. Cl.
*B22F 7/00* (2006.01)
*B29C 35/02* (2006.01)

(52) U.S. Cl. .............................. 419/6; 419/30; 419/36; 419/65; 425/130; 425/174.4

(58) Field of Classification Search ................... 419/6, 419/30, 35; 425/130, 174.4
See application file for complete search history.

(56) References Cited

U.S. PATENT DOCUMENTS

| | | | |
|---|---|---|---|
| 3,933,706 A * | 1/1976 | Momiyama et al. ........ 524/442 |
| 3,969,547 A | 7/1976 | Isawa et al. |
| 4,505,981 A * | 3/1985 | Geist ........................... 428/418 |
| 5,088,047 A | 2/1992 | Bynum et al. |
| 5,121,329 A | 6/1992 | Crump |
| 5,204,055 A | 4/1993 | Sachs et al. |
| 5,749,041 A * | 5/1998 | Lakshminarayan et al. .... 419/2 |
| 5,792,821 A * | 8/1998 | Bowen ..................... 526/238.2 |
| 6,363,606 B1 * | 4/2002 | Johnson et al. ............... 29/854 |
| 6,585,367 B2 | 7/2003 | Gore |
| 2001/0050031 A1 * | 12/2001 | Bredt et al. .............. 106/162.9 |
| 2002/0176793 A1 | 11/2002 | Moussa et al. |

FOREIGN PATENT DOCUMENTS

DE    10158233 A1    11/2001

OTHER PUBLICATIONS

European Search Report for Application No. EP 04256135.7. Report issued May 23, 2006.

* cited by examiner

*Primary Examiner*—Ngoclan T. Mai

(57) ABSTRACT

A method for solid free-form fabrication of a three-dimensional metal object includes depositing a particulate blend in a defined region, the particulate blend including a number of metal or metal alloy particulates and a peroxide, and selectively ink-jetting a binder system onto a predetermined area of the particulate blend to form a green part, wherein the liquid phase binder includes a water soluble monofunctional acrylate-based monomer, a water soluble difunctional acrylate-based monomer, an amine, and water.

49 Claims, 7 Drawing Sheets

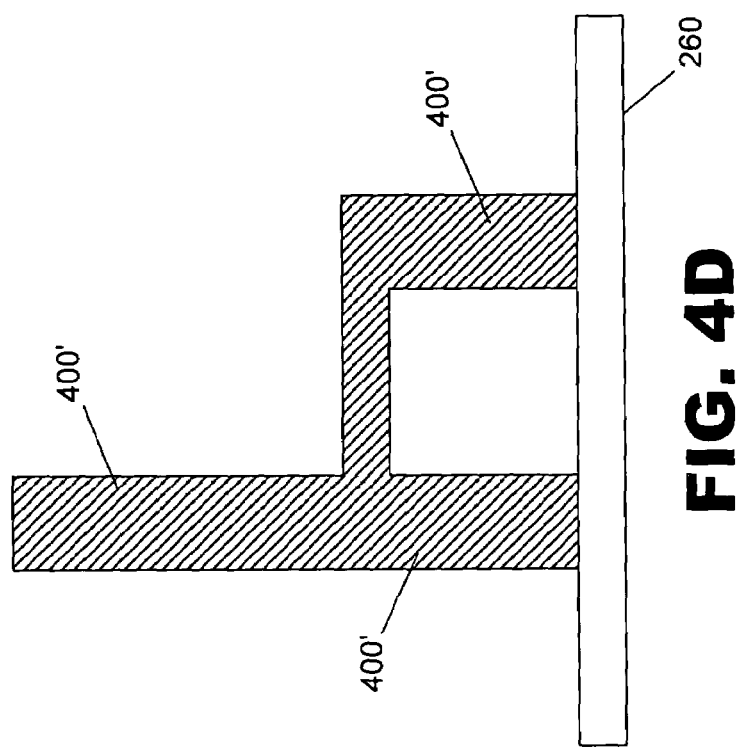
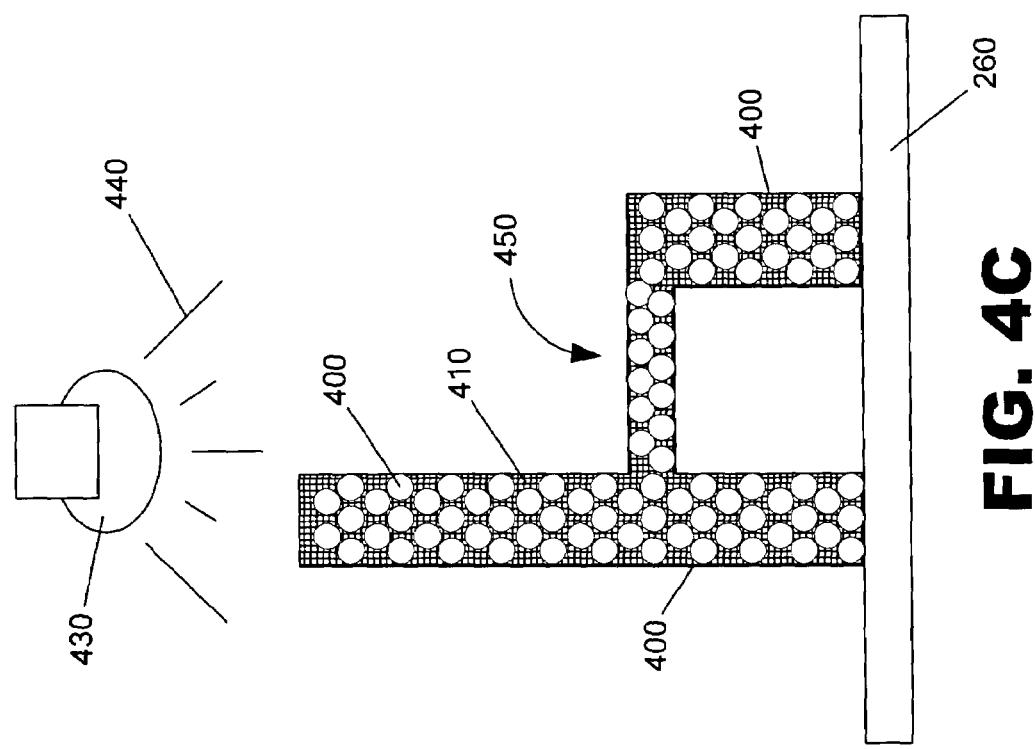

SYSTEM AND METHOD FOR FABRICATING A THREE-DIMENSIONAL METAL OBJECT USING SOLID FREE-FORM FABRICATION

BACKGROUND

The efficient production of prototype three-dimensional compositions or objects can provide an effective means of reducing the time it takes to bring a product to market at a reasonable cost. A typical approach for preparing prototypes has required specific tooling, such as molds and dies, which can be a slow and cumbersome process.

Recently, computerized modeling has alleviated some of the need for building prototypes by providing a good idea of what a product will look like without a specialized tooling requirement. However, the fabrication of a tangible object is still often preferred for prototyping. The merging of computer modeling and the physical formation of three-dimensional objects is sometimes referred to as solid free-form fabrication.

Solid free-form fabrication (SFF) is a process whereby three-dimensional objects, for example, prototype parts, models, working tools, production parts, molds, and other articles are manufactured by sequentially depositing layers of a structural material. Computer aided design (CAD) is commonly used to automate the design process. Using a suitable computer, an operator may design a three-dimensional article and then create that object by employing a positionable ejection head that selectively emits the structural material. Various techniques that employ solid free-form fabrication have been explored.

Traditional methods of forming solid free-form fabrication objects include using commercially available gypsum and biopolymer systems or acid-base cements. Traditional methods have also been developed to form solid metal objects. These traditional methods create parts with relatively low green strength.

SUMMARY

A method for solid free-form fabrication of a three-dimensional metal object includes depositing a particulate blend in a defined region, the particulate blend including a number of metal or metal alloy particulates and a peroxide, and selectively ink-jetting a binder system onto a predetermined area of the particulate blend to form a green part, wherein the liquid phase binder includes a water soluble monofunctional acrylate-based monomer, a water soluble difunctional acrylate-based monomer, an amine, and water.

BRIEF DESCRIPTION OF THE DRAWINGS

The accompanying drawings illustrate various exemplary embodiments of the present system and method and are a part of the specification. The illustrated embodiments are merely examples of the present system and method and do not limit the scope thereof.

FIG. 4C is a cross-sectional view illustrating the removal of organic content from a green part by thermal binder burnout according to one exemplary embodiment.

FIG. 4D is a cross-sectional view illustrating a metal object formed by the present method according to one exemplary embodiment.

Throughout the drawings, identical reference numbers designate similar, but not necessarily identical, elements.

DETAILED DESCRIPTION

Figure 1:
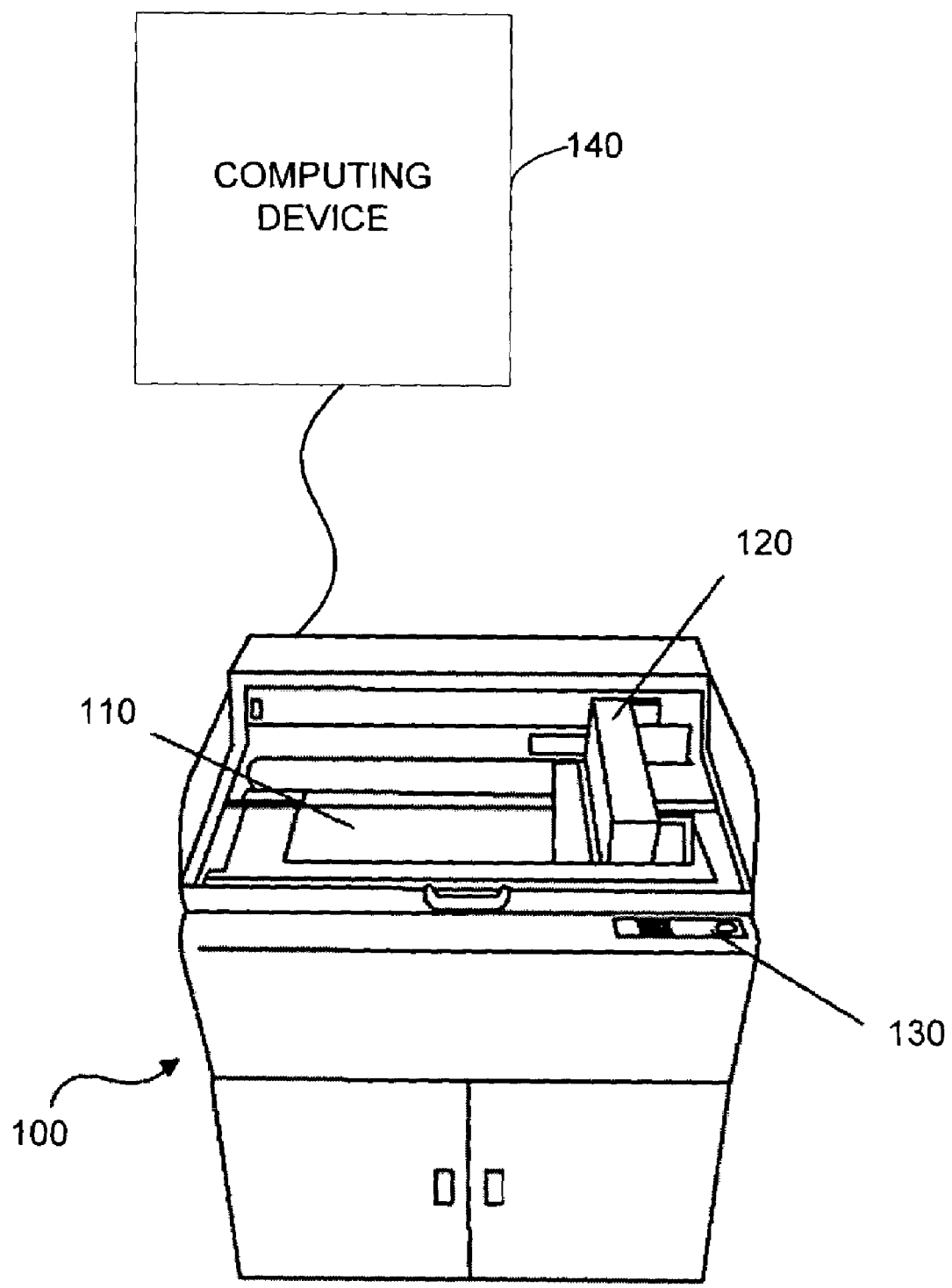
FIG. 1 is a perspective view of a solid free-form fabrication system that may be used to implement exemplary embodiments of the present system and method.

An exemplary method and apparatus for forming SFF articles with metal-based powder is described herein. More specifically, an exemplary additive fabrication process is presented that includes the distribution of metal-based powders followed by the jetting of an appropriate binder system that defines a desired three-dimensional object. Once the desired three-dimensional object is defined by the jetting of the binder system, the green part is removed from un-bound metal-based powder and processed by a thermal binder burnout process to substantially remove organic content, followed by a high temperature sintering operation. Once the thermal binder burnout processing has been completed, a strong metal part results. The present specification discloses the composition of both exemplary binder systems and various exemplary metal-based powders that can be used to fabricate three-dimensional metal objects.

As used in this specification and in the appended claims, the term "binder" is meant to be understood broadly as any material used to physically bind separate particles together or facilitate adhesion to a surface. Additionally, the term "substrate" is meant to be understood as any build platform, removable material, or previously deposited reactive or powder material. A "build platform" is typically the rigid substrate that is used to support deposited material in an SFF apparatus. Similarly, the term "curing" is meant to refer to the process of hardening to form a solid three-dimensional object. Moreover, the term "thermal binder burnout" is meant to be understood as any process configured to provide thermal energy to a green part in order to remove inorganic volatiles, as well as organic material from the green part or to change the physical attributes of the green part. "Sintering" is meant to refer to a thermal process that results in the consolidation and bonding of the metallic particles, after the volatiles and organic materials have been removed by the thermal binder burnout process. The consolidation of the metallic particles can be achieved by solid state diffusion bonding, partial melting of one or more phases or particles present, or a combination of solid state diffusion bonding and partial melting. A "green part" shall be understood both here and in the appended claims as any component or mixture of components that is not yet fully processed or cured.

In the following description, for purposes of explanation, numerous specific details are set forth in order to provide a thorough understanding of the present system and method for forming three-dimensional metal SFF objects. It will be apparent, however, to one skilled in the art, that the present method may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Exemplary Structure

FIG. 1 illustrates an exemplary solid free-form fabrication (SFF) system (100) that may incorporate the present method of forming three-dimensional metal SFF objects. As shown in FIG. 1, an exemplary solid free-form fabrication system (100) may include a fabrication bin (110), a moveable carriage (120), and a display panel (130) including a number of controls and displays. Additionally, a computing device (140) may be communicatively coupled to the SFF system (100).

The fabrication bin (110) shown in FIG. 1 may be configured to receive and facilitate the building of a desired three-dimensional metal object on a substrate. The building of the desired three-dimensional metal object may include the spreading of a metal-based powder and the selective dispensing of a binder into the powder. While the SFF system (100) illustrated in FIG. 1 is shown as a single, stand-alone, self-contained SFF system, the present metal-based powder SFF system and methods may be incorporated into any SFF system that utilizes powder-based components, regardless of the structure or configuration of the free-form fabrication system.

The moveable carriage (120) of the SFF system (100) illustrated in FIG. 1 is a moveable material dispenser that may include any number of inkjet material dispensers configured to dispense liquid binder material. The moveable carriage (120) may be controlled by a computing device (140) and may be controllably moved by, for example, a shaft system, a belt system, a chain system, etc. As the moveable carriage (120) operates, the display panel (130) may inform a user of operating conditions as well as provide the user with a user interface.

As a desired three-dimensional metal object is formed, the computing device (140) may controllably position the moveable carriage (120) and direct one or more of the dispensers (not shown) to controllably dispense a jetted binder system at predetermined locations within the fabrication bin (110) thereby forming a green part that represents the desired three-dimensional object. The inkjet material dispensers used by the solid free-form fabrication system (100) may be any type of inkjet dispenser configured to perform the present method including, but in no way limited to, thermally actuated ink-jet dispensers, mechanically actuated inkjet dispensers, electrostatically actuated inkjet dispensers, magnetically actuated dispensers, piezoelectrically actuated dispensers, continuous inkjet dispensers, etc. Additionally, the ink-jet printhead dispenser can be heated to assist in dispensing viscous chemical compositions. A more demonstrative cross-sectional view of the SFF apparatus of FIG. 1 is presented in FIG. 2.

Figure 2:
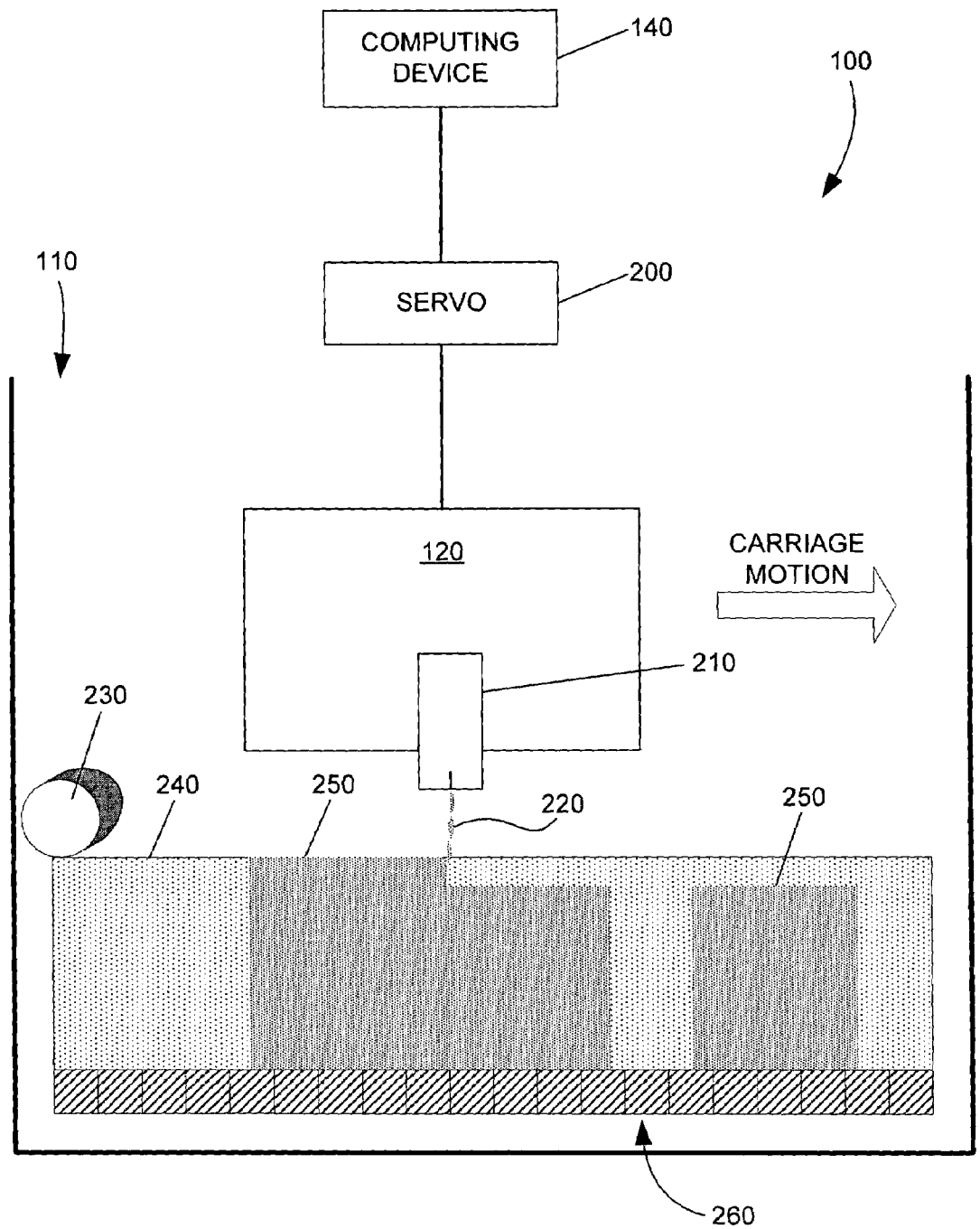
FIG. 2 is a cross-sectional view of a solid free-form fabrication system that may be used to implement exemplary embodiments of the present system and method.

As shown in FIG. 2, the computing device (140) may be communicatively coupled to a servo mechanism (200). The computing device (140) may be configured to communicate commands to the servo mechanism (200) causing it to selectively position the moveable carriage (120). One or more inkjet dispensers (210) may be coupled to the moveable carriage (120) and to a number of material reservoirs (not shown). Once positioned by the servo mechanism (200), the inkjet dispenser (210) may eject a jetted binder system (220) supplied by the material reservoir. The jetted binder system (220) that is stored in the material reservoir (not shown) and supplied to the ink-jet dispenser (210) to be dispensed is selected with a "jettable" viscosity configured to be dispensed by any one of the inkjet dispensers mentioned above. Additionally, the jetted binder system (220) is selected to have a fairly fast reaction rate. The jetted binder system (220) will be further described below with reference to the exemplary compositions.

FIG. 2 also illustrates the components of the present system that may be incorporated to receive the jetted binder system (220) and aid in the formation of a desired three-dimensional metal object. As shown in FIG. 2, the fabrication bin (110) of the SFF system (100) may include a substrate (260) having a metal-based powder (240) disposed thereon. According to one exemplary embodiment, the metal-based powder (240) may be dispensed layer-by-layer onto the substrate (260) in bulk quantities from a metal-based powder reservoir (not shown) and planarized to a desired thickness with the use of a mechanical roller (230) or other planarizing device. Control of the mechanical roller (230) may be performed by the servo mechanism (200) to controllably deposit and planarize the metal-based powder (240) on the substrate (260). The metal-based powder (240) dispensed on the substrate may include, but is in no way limited to a metal, a metal alloy in powder form, or a mixture of different metal powders, and peroxide. Composition, interaction, and functions of the components of the metal-based powder (240) as well as a method for its use will be described in further detail below with reference to FIGS. 2 through 4D.

Once the jetted binder system (220) is dispensed in the layer of metal-based powder (240), a mixture (250) of jetted binder system (220) and metal-based powder (240) exists on the substrate (260). The mixture (250) defines the desired three-dimensional object. The system and method for using the solid free-form fabrication system (100) illustrated in FIG. 2 will be described in detail below with reference to FIG. 3 through FIG. 4D.

Exemplary Compositions

One exemplary embodiment of the present system and method for forming three-dimensional metal objects by SFF is based on employing a pre-polymer binder system that reacts with a powdered metal containing peroxide to create parts with good green strength and good dimensional control after firing/sintering.

The jetted binder system (220) illustrated in FIG. 2 is configured to bind together the metal or metal alloy particles that make up the metal-based powder (240). The jetted binder system (220) binds the metal particles of the metal-based powder (240), according to one exemplary embodiment, by polymerizing around the metal-based powder upon contact. This exemplary embodiment allows the metal-based powder (240) to be physically coupled without necessitating a reaction between the metal-based powder and the jetted binder system (220).

Additionally, the jetted binder system (220) is configured such that it may be dispensed by any number of inkjet print heads including, but in no way limited to, thermally actuated inkjet dispensers, mechanically actuated inkjet dispensers, electrostatically actuated inkjet dispensers, magnetically actuated dispensers, piezoelectrically actuated dispensers, continuous ink-jet dispensers, etc. In contrast to the present system, traditional binder compositions had to be deposited by either continuous-stream print heads or piezo-electrically actuated drop-on-demand print heads due to their composition. However, continuous-stream print heads and piezo-electrically actuated drop-on-demand print heads involve frequent maintenance and should be flushed when changing from one binder system (220) to another. Flushing is inefficient and creates unnecessary waste. The ability of the present system and method to selectively deposit the present jetted binder system (220) with a thermally actuated or otherwise actuated print head alleviates the above-mentioned short comings.

One exemplary embodiment of the present jetted binder system (220) includes, but is in no way limited to, a water soluble monofunctional acrylate-based monomer, a water soluble difunctional acrylate-based monomer, an amine, and water. The individual components of the present jetted binder system (220) will now be explained in further detail below.

The water soluble monofunctional acrylate-based monomer is included in the present jetted binder system (220) to facilitate polymerization upon initiation of a polymerization reaction caused by a water soluble amine combining with peroxide. The water soluble monofunctional acrylate may be, but is in no way limited to, esters of acrylic acid and methacrylic acid.

The water soluble difunctional acrylate-based monomer is included in the present jetted binder system (220) to enhance cross-linking of the binder system during the polymerization reaction. The water soluble difunctional acrylate-based monomer may include, but is in no way limited to, 1,4-butanediol diacrylate, 1,4-butanediol dimethacrylate, 1,6-hexamethylene glycol diacrylate, neopentyl glycol dimethacrylate, trimethylol propane trimethacrylate, pentaerythritol triacrylate, penta-erythritol trimethacrylate, triethylene glycol triacrylate, triethylene glycol trimethacrylate, urethane acrylate, trimethylol propane triacrylate, and urethane methacrylates.

The amine component of the present jetted binder system (220) prompts the decomposition of peroxide at room temperature. According to one exemplary embodiment, the present jetted binder system (220) is selectively jetted onto a metal-based powder (240) that includes peroxide. According to this exemplary embodiment, the amine component of the present jetted binder system (220) reacts with the peroxide contained with the metal or metal alloy based powder to produce free-radicals thereby enabling rapid free-radical polymerization of unsaturated pre-polymers. According to one exemplary embodiment, the amine component of the present jetted binder system (220) may include, but is in no way limited to, aromatic amines including dimethylamino benzoate, dihydroxyethyl-p-toluidine, dimethylaniline, diethylaniline, dimethylacetamide, and the like. Amine promoters can also be used in conjunction with cobalt promoters in conjunction with certain peroxide initiators like methyl ethyl ketone peroxide, particularly when rapid curing is desirable. This embodiment forms a hardening composition by free-radical polymerization of unsaturated pre-polymers.

The water component of the present jetted binder system (220) is included in the binder system to reduce viscosity and increase jettability. The reduction in viscosity and increase in jettability allows the present jetted binder system to be selectively deposited by any number of ink-jet print heads.

The present jetted binder system (220) illustrated in FIG. 2 may also include a number of additives to improve jettability including, but in no way limited to, surfactants, humectants, co-solvents, etc. While a liquid binder of water alone is jettable, it is jetted inefficiently. The present liquid phase binder (220) is aqueous based but due to the added reactive components, the following are also typically added to improve jettability: surfactants and viscosity modifiers including, but in no way limited to, surfynol 465.

According to one exemplary embodiment, the present jetted binder system (220) comprises approximately 10 to 40% glycerol dimethacrylate (30% by wt.), approximately 30 to 80% 2-hydroxy ethyl methacrylate (HEMA) (55% by wt.), approximately 10 to 20% de-ionized water (14.5% by wt.), and approximately 0.1 to 5% N,N-dimethyl-4-ethylbenzoate (0.5% by wt).

The metal-based powder (240) that is disposed on the substrate (260) in FIG. 2 receives the jetted binder system (220) and forms the structural basis of the desired three-dimensional metal object. According to one exemplary embodiment, the metal-based powder (240) disposed on the substrate (260) may include a metal or metal alloy based powder, or a mixture of metal/metal alloy powders (1–50 microns) and peroxide (5–20 microns).

The metal or metal alloy in powder form component of the metal-based powder (240) may be any combination of metals or metal alloys that, when sintered, coalesce and become a continuous metal part. Possible metal powders, metal alloy powders, or mixtures of different metal powders, include, but are in no way limited to, stainless steel alloys 303, 304, 310, 316, 321, 347, 410, 420, 430, 440, PH 13–8, 17–4 PH; magnetic alloys including, but in no way limited to, Fe/Ni, Fe/Si, Fe/Al, Fe/Si/Al, Fe/Co, Fe/CoN; cobalt alloys including, but in no way limited to satellite 6 or satellite 12; copper, copper alloys, bronze (Cu/Sn), brass (Cu/Zn), tin, lead, gold, silver, platinum, palladium, iridium, titanium, tantalum, iron, aluminum alloys, magnesium alloys, iron alloys, nickel alloys, chromium alloys, silicon alloys, zirconium alloys, gold alloys, and any appropriate combinations thereof.

Additionally, the peroxide component of the metal-based powder (240) may include, but is in no way limited to, peroxide initiators such as methyl ethyl ketone peroxide, benzoyl peroxide, acetylacetone peroxide, cumene hydroperoxide and the like.

According to one exemplary embodiment, the metal-based powder (240) includes approximately 99% by weight 434 stainless steel metal-based powder (15 micron) or approximately 95 to 99.5% 410 stainless steel metal-based powder (15 micron), and approximately 1% benzoyl peroxide (1–20 micron). Objects printed with the above-described binder/metal-based powder compositions yield strong green parts before sintering as well as strong metal parts after sintering. Traditional techniques that do not yield strong green parts require the parts to be sintered while still surrounded by un-reacted powder or be removed and repacked in a ceramic powder prior to sintering.

While the above paragraphs illustrate a number of possible chemistries that may be used to form a binder system and metal-based powder to be used for the production of three-dimensional metal objects through SFF, cure rate, green strength, and wettability of the powder/binder system may be altered by varying the chemistry and percentages of the above-mentioned components. Moreover, additional water soluble reactants and amines may be added to the jetted binder system, or peroxides of varying reactivity may be added to the metal-based powder to vary the properties of the green part produced by the present SFF process. Exemplary embodiments for using the above-mentioned structure and compositions will now be explained in detail below.

Exemplary Implementation and Operation

Figure 3:
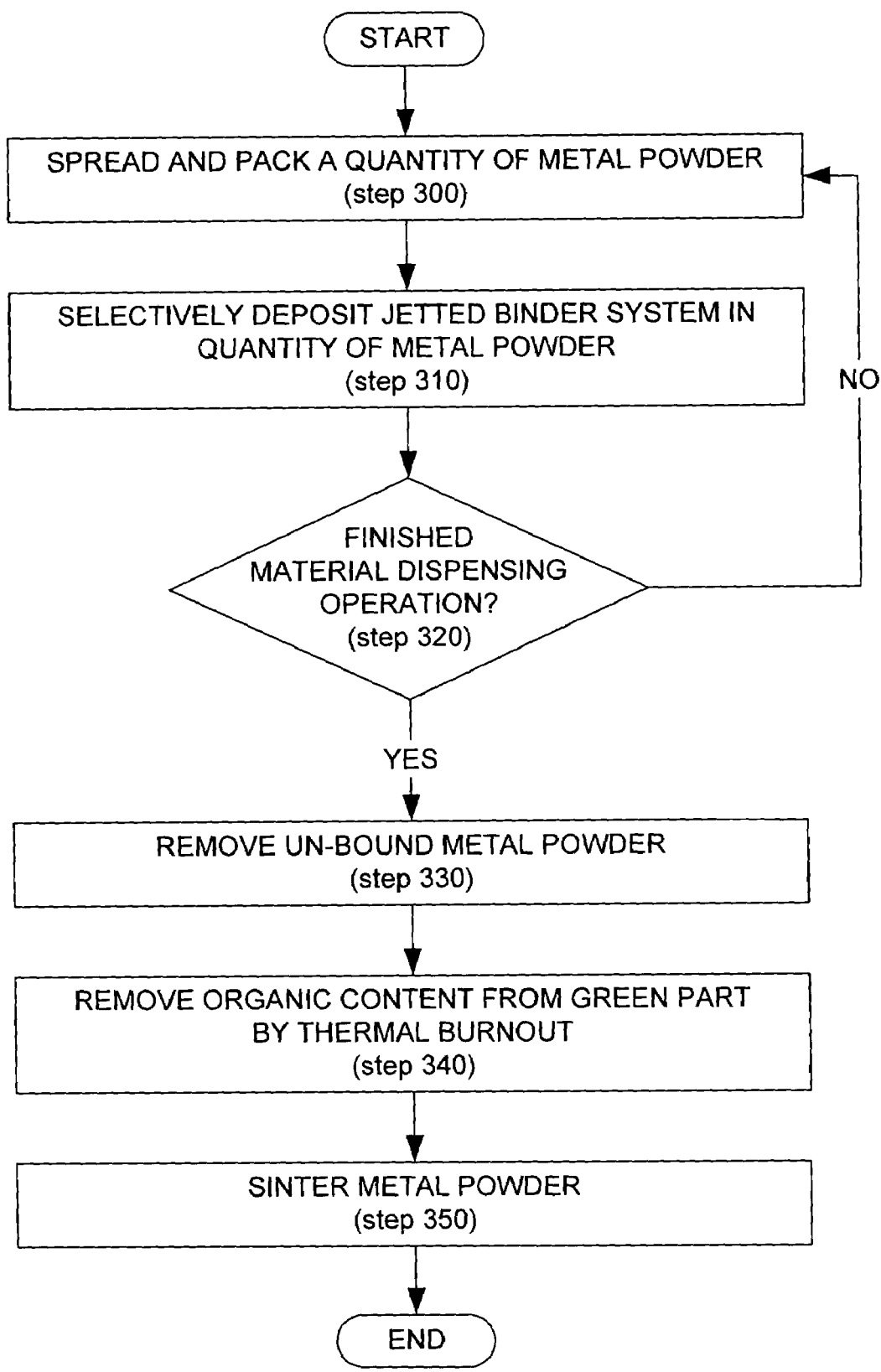
FIG. 3 is a flow chart illustrating a method for performing the present method of forming SFF objects using metal-based powder according to one exemplary embodiment.

FIG. 3 is a flow chart illustrating a present method for operating the solid free-form fabrication system (100; FIG. 2) illustrated in FIG. 2 incorporating a metal-based powder according to one exemplary embodiment. As illustrated in FIG. 3, the present method may begin by spreading and packing a quantity of metal-based powder in the fabrication bin or on a substrate (step 300). Once the quantity of metal-based powder has been spread and packed as necessary (step 300), the SFF apparatus selectively deposits a jetted binder system into the newly spread layer of metal-based powder (step 310). When the volume of binder has been jetted into the metal-based powder, an operator or a coupled computing device determines whether the material dispensing operation is complete (step 320). If the material dispensing operation is not complete (NO, step 320), the present system and apparatus may again spread and pack a quantity of metal-based powder (step 300) and continue depositing jettable binder system (step 310) until the material dispensing operation is complete. Once the material dispensing operation is complete (YES, step 320), the green part may be removed from any unbound metal-based powder (step 330). A thermal binder burnout process may then be performed (step 340) to remove organic content from the green part. Immediately following the thermal binder burnout, a high temperature sintering process (step 350) is used to consolidate and bond the metal-based powder particles. Each of the above-mentioned steps of FIG. 3 will now be explained in detail with reference to FIGS. 4A through 4D.

Figure 4A:
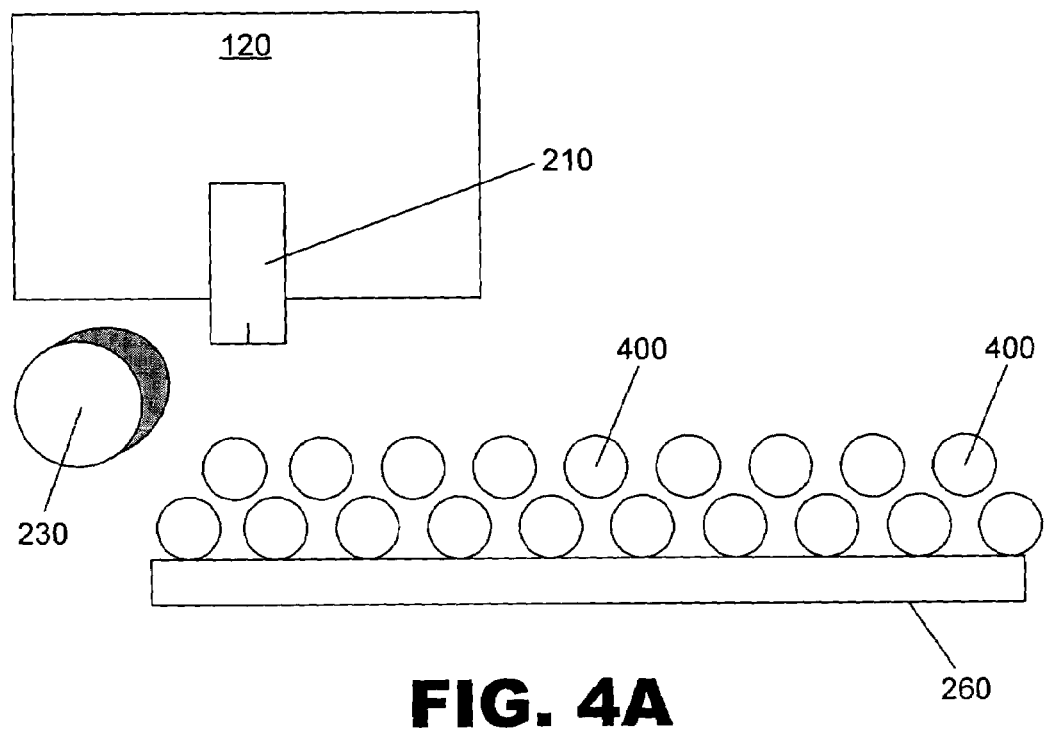
FIG. 4A is a cross-sectional view illustrating a metal powder that may be used by the present method according to one exemplary embodiment.

As shown in the flow chart of FIG. 3, the present method begins by spreading and packing a layer of metal-based powder (step 300). FIG. 4A illustrates how the mechanical roller (230) may spread and pack a thin layer of metal-based powder (400) on the substrate (260). First, a predetermined amount of metal-based powder (400) is deposited on the substrate from a powder reservoir (not shown). Once deposited, the mechanical roller (230) packs and spreads a quantity of the metal-based powder (400). The amount of metal-based powder (400) that remains on the substrate after the mechanical roller (230) has spread and packed a thin layer corresponds to the distance between the mechanical roller (230) and the substrate (260) if no material deposition operations have been performed. Similarly, if a number of material deposition operations have been performed, the amount of metal-based powder (400) that remains on the substrate after a roller operation corresponds to the distance between the mechanical roller (230) when it performs its spreading and packing operation and the previously dispensed binder/powder mixture (250; FIG. 2). The amount of metal-based powder (400) deposited by the mechanical roller (230) may be adjusted by the servo mechanism (200; FIG. 2) and optimized to correspond to the jetted binder ejection rate of the inkjet dispenser (210).

Figure 4B:
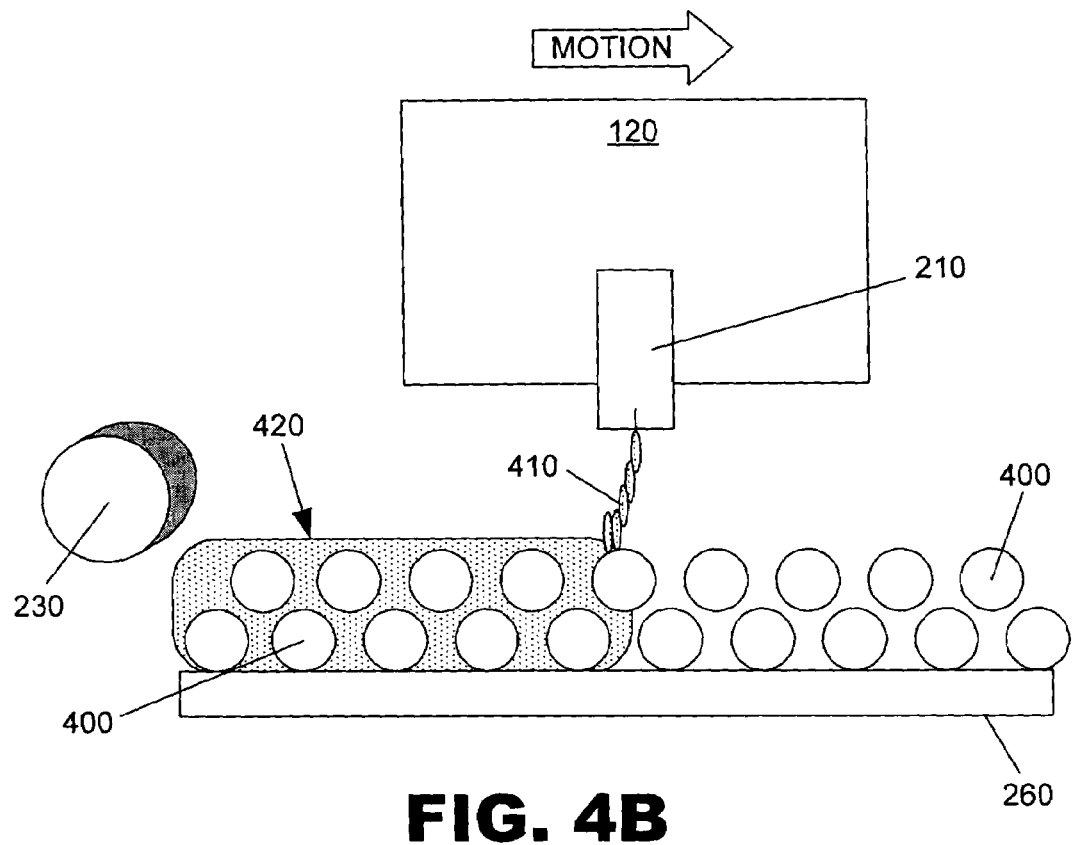
FIG. 4B is a cross-sectional view showing the deposition of a jetted binder system into a quantity of metal-based powder according to one exemplary embodiment.

Once a layer of metal-based powder (400) has been spread and packed by the mechanical roller (step 300; FIG. 3), the inkjet dispenser (210) may selectively deposit a quantity of jetted binder system (step 310) into the metal-based powder. As shown in FIG. 4B, the moveable carriage (120) and consequently the inkjet dispenser (210) may be controllably positioned by the computing device (140; FIG. 2) and the servo mechanism (200) adjacent to the metal-based powder (400). When in a desired location, as directed for example by a CAD program, the inkjet dispenser (210) is actuated to dispense a pre-determined quantity of the jetted binder system (410). The jetted binder system (410) may be jetted to bind metal-based powder (400) defining the entire desired three-dimensional object, or alternatively jetted to form a shell that defines the outer surface of the desired three-dimensional object. According to this exemplary embodiment of the metal-based powder (400), a shell may be formed defining the outer surface of the desired three-dimensional object and containing sufficient metal-based powder (400) to form a solid object. The metal-based powder (400) disposed within the shell would then be contained within the shell and would be encapsulated until the sintering process explained below.

As is shown in FIG. 4B, when the jetted binder system (410) is dispensed by the inkjet dispenser (210) onto the layer of metal-based powder (400), the jetted binder system disperses around and mixes with the metal-based powder (400). This mixture (420) of jetted binder system (410) and metal-based powder (400) define the cross-section of the desired three-dimensional metal object or its shell. Once mixed into a mixture, the peroxide component of the metal-based powder (400) combines with the water-soluble amine of the jetted binder system (410) to initiate radical polymerization of the jetted binder around the metal or metal alloy in powder form component of the metal-based powder. The present mixture (420) of jetted binder system (410) and metal-based powder (400) avoids a number of dimensional accuracy issues that arise in systems where the powder and the binder react. When sufficient jetted binder system (410) has been deposited on a layer of metal-based powder (400) to cover a designated portion of the layer of metal-based powder, the moveable carriage (120) is translated to selectively deposit jetted binder system (410) onto other areas of the metal-based powder (410) as indicated by the "motion" arrow.

The strength of the green part being created by the present system and method may be affected by the amount of "mixing" that occurs between the jetted binder system (410) and the metal-based powder (400). The mixing of the two materials may in turn be dependent upon a number of factors including, but in no way limited to, the viscosity of the jetted binder system (410). A number of optional steps may also be performed to facilitate the mixing of the jetted binder system (410) with the metal-based powder (400) including, but in no way limited to, applying ultrasonic energy to the mixture (420).

Similarly, the viscosity of the jetted binder system may be decreased by increasing the temperature of the inkjet dispenser (210). The ability to control the temperature of the inkjet dispenser (210) allows for the incorporation of more viscous higher molecular weight fluids, which can provide for more desirable mechanical properties of the resulting green part. However, the temperature of the inkjet dispenser (210) should not exceed the vaporization temperature, decomposition temperature, or thermal activation temperature of the binder.

Once the mixture (420) of jetted binder system (410) and metal-based powder (400) has been sufficiently "mixed," the jetted binder system begins to cure thereby setting the shape of the green part. As the jetted binder system (410) cures, the amine component of the jetted binder system (410) prompts the decomposition of the peroxide included in the metal-based powder (400) thereby producing a number of free-radicals. The free-radicals produced by the above-mentioned reaction enable rapid free-radical polymerization of the water soluble monofunctional acrylate-based monomer and cross-linking of the water soluble difunctional acrylate-based monomer components of the jetted binder system (410). As the jetted binder system (410) cures, the binder encapsulates the metal-based powder (400) to form a binder/ powder composite matrix (450; FIG. 4C). The binder/powder composite matrix (450; FIG. 4C) provides sufficient structural strength to maintain the shape of the green part during subsequent processing.

Once a layer of the mixture (420) of jetted binder system (410) and metal-based powder (400) have been sufficiently "mixed" and the binder begins to cure, the computing device (140; FIG. 2) will determine whether the solid free-form fabrication system (100; FIG. 2) has finished the material dispensing operation (step 320; FIG. 3) defining a desired three-dimensional metal object. If the requisite layers of binder/powder composite matrix (450; FIG. 4C) have been formed to construct the green part of a desired three-dimensional metal object, the computing device (140; FIG. 2) will determine that the material dispensing operation is complete (YES, step 320; FIG. 3) and the solid free-form fabrication system (100; FIG. 2) will end its material dispensing operation. If, however, the computing device determines that the entire binder/powder composite matrix (450) has not been formed (NO, step 320; FIG. 3) sufficient to form the green part, the solid free-form fabrication system (100; FIG. 2) spreads and packs another layer of metal-based powder (step 300) and the process begins again.

Once the material dispensing operation has been completed, the green part formed by the above-mentioned process is removed from any unbound metal-based powder (step 330; FIG. 3) as shown in FIG. 4C. The unbound metal-based powder may be removed from the green part by any number of methods including, but in no way limited to, mechanical brushing means, cleansing the green part through the application of air, water, or solvent on the green part, etc. The removal of the unbound metal-based powder from the green part may occur either within the SFF system (100; FIG. 2) or in another location.

When the green part has been substantially removed from the unbound metal-based powder (step 330; FIG. 3), the green part may be processed to produce the desired three-dimensional metal object through a thermal binder burnout process (step 340; FIG. 3) followed by a sintering process (step 350; FIG. 3). The thermal binder burnout process may occur within the SFF system (100; FIG. 2), in an external furnace, or in any other apparatus configured to controllably supply thermal energy to the binder/powder composite matrix (450; FIG. 4C). FIG. 4C illustrates a thermal binder burnout process being performed in an external furnace that includes a heating component (430) configured to controllably provide thermal energy (440) to the binder/powder composite matrix (450) that makes up the green part.

During the thermal binder burnout process, inorganic volatiles and the organic content is removed from the green part. Generally, the firing of the thermal binder burnout process should be of sufficient duration so as to remove the inorganic volatiles, as well as the organic materials from the structure. In particular, the thermal binder burnout process should be of sufficient temperature and duration to decompose the polymers that make up the binder/powder composite matrix (450) and to allow for their removal from the green part.

After the thermal binder burnout process (step 340; FIG. 3), the part is then subjected to a generally higher temperature sintering operation (step 350; FIG. 3). In this operation, the metal particles are consolidated or bonded together. The consolidation of the metallic particles can be achieved by solid state diffusion bonding, partial melting of one or more phases or particles present, or a combination of solid state diffusion bonding and partial melting. This sintering operation is analogous to the sintering used in traditional powder metallurgy fabrication.

The temperature and time profile of the thermal binder burnout and sintering processes may be performed in a plurality of steps or in a single process. The temperature and time profile of the thermal binder burnout and sintering processes affect the ability of gases produced by the decomposition of the organic binder to diffuse from the non-organic material. The thermal binder burnout and sintering profile and environment may be designed and modified for any metal powder type used. According to one exemplary embodiment, a programmable furnace with the capability to provide oxidizing and/or reducing environments performs the thermal binder burnout and sintering process. According to this exemplary embodiment, the programmable furnace may provide oxidizing-air, reducing-hydrogen/nitrogen (4% hydrogen), dissociated ammonia (25% nitrogen/75% hydrogen), and/or pure hydrogen at various points of the thermal binder burnout and sintering processes. The environment provided for the thermal binder burnout and sintering process may be an oxidizing environment, a reducing environment, or an inert environment configured to affect the resulting structure of the sintered material. In general, it is desirable to complete the thermal binder burnout operation under an oxidizing atmosphere, while the subsequent sintering operation is completed at a higher temperature under a reducing atmosphere.

Once the green part experiences the thermal binder burnout (step 340; FIG. 3) and sintering processes (step 350; FIG. 3), a three-dimensional part, illustrated in FIG. 4D, is produced being made up of sintered metal powder (400'). The sintered metal (400') produced by the present system and method closely corresponds to the binder/powder composite matrix (450; FIG. 4C) that made up the green part.

ALTERNATIVE EMBODIMENT

Figure 5:
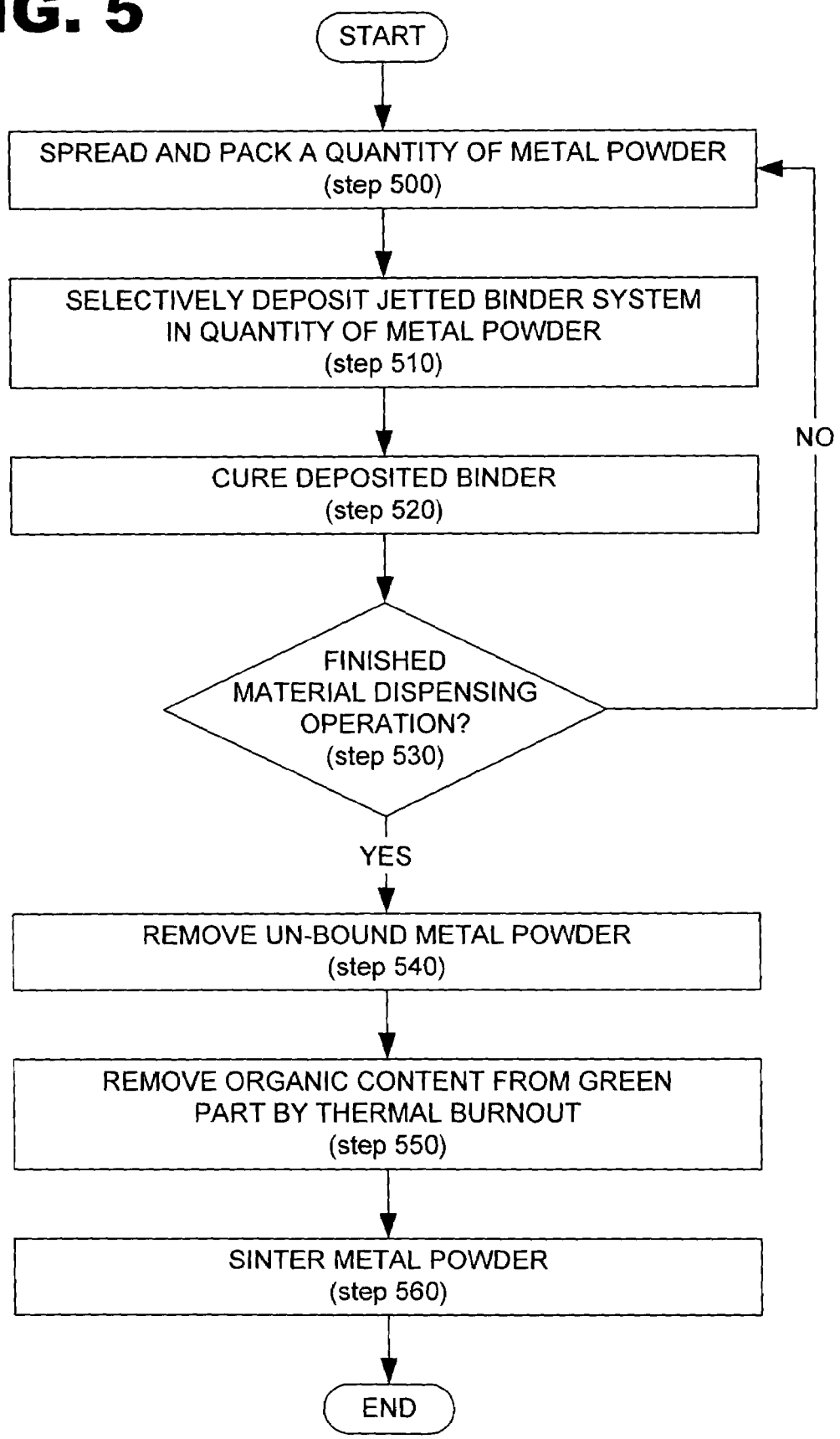
FIG. 5 is a flow chart illustrating an alternative method for performing the present method of forming SFF objects using metal-based powder according to one exemplary embodiment.

FIG. 5 is a flow chart illustrating an alternative method for performing the present method while incorporating the option of curing the jetted binder system through the application of ultraviolet (UV) radiation. Similar to the embodiment explained above, the exemplary embodiment spreads and packs a quantity of metal-based powder in the fabrication bin or on a substrate (step 500) and selectively deposits a jetted binder system into the newly spread layer of metal-based powder (step 510). According to this exemplary embodiment, a UV initiator including, but in no way limited to, a free radical initiator or a cationic initiator is included in the metal-based powder and/or in the jetted binder system. When the volume of binder has been jetted into the metal-based powder, the binder is cured through the application of UV radiation (step 520). Once the jetted binder system is cured (step 520), the alternative method closely follows the above-mentioned method by determining whether the material dispensing operation is complete (step 530), removing un-bound metal powder (step 540) if the material dispensing operation is complete (YES, step 530), removing organic content from the green part by thermal burnout (step 550), and sintering the metal powder (step 560) to form the desired three-dimensional metal part. If the material dispensing operation is not complete (NO, step 520), the present system and apparatus may again spread and pack a quantity of metal-based powder (step 500) and continue depositing jettable binder system (step 510) until the material dispensing operation is complete.

Figure 6:
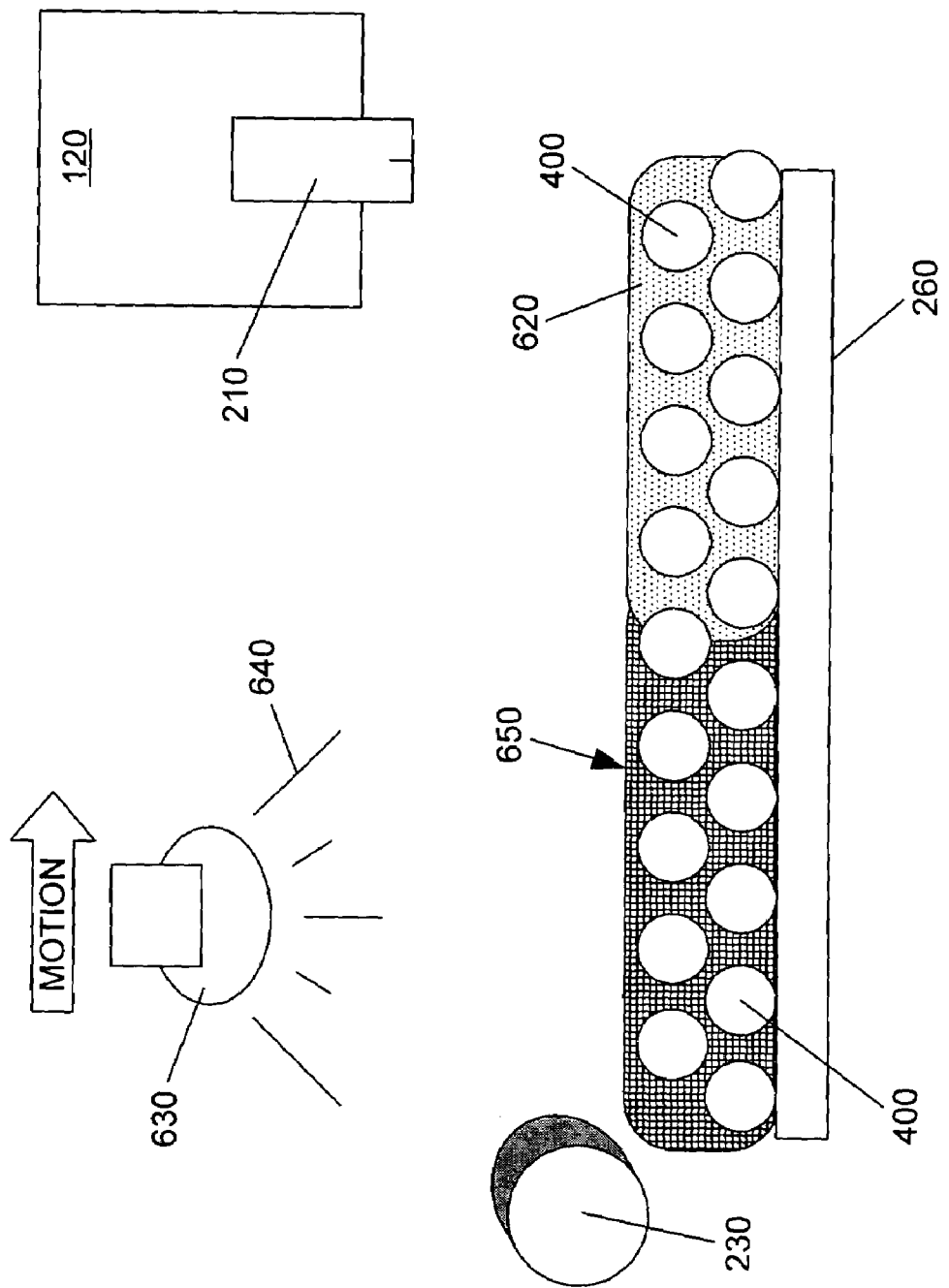
FIG. 6 is a cross-sectional view illustrating the solidification of a jetted binder system with ultraviolet radiation according to one exemplary embodiment.

FIG. 6 illustrates an exemplary method of applying UV radiation to the jetted binder system to cure the deposited binder (step 520). As shown in FIG. 6, the UV curable binder (620) disperses around the metal-based powder (400). Once the metal-based powder (400) and the UV curable binder (620) have been sufficiently "mixed," the UV curable binder may be cured through the application of ultraviolet (UV) radiation energy. When UV radiation energy (640) is applied to the UV curable binder (620), the added energy initiates polymerization, resulting in rapid curing of the UV curable binder (620). As the UV curable binder (620) cures, the cured binder (650) encapsulates the metal-based powder (400) to form a binder/powder composite matrix defining the desired three-dimensional metal object or a shell thereof.

The UV radiation energy (440) may be supplied to one or multiple volumes of the UV curable binder (620) by a UV radiation applicator (630). The UV radiation applicator (630) may be any device configured to apply ultraviolet (UV) or other radiation energy sufficient to initiate polymerization in the UV curable binder (620). As shown in FIG. 6, the radiation applicator (630) may be a separate light exposer or scanning unit configured to flood expose all or selective portions of deposited UV curable binder (620) after it has been deposited. Alternatively, the radiation applicator (630) may be coupled to the moveable carriage (120) as a scanning unit. Moreover, the polymerization and thus the rapid curing of the UV curable binder (620) may be further facilitated by the addition of thermal energy or any additive capable of increasing the curing process including, but in no way limited to, catalysts.

In conclusion, the present system and method for producing three-dimensional metal objects through SFF substantially increases the green strength of produced parts, thereby enabling part manipulation without concern for part breakage, while incorporating a binder chemistry that may be tailored toward specific metal types. The cure rate, the green strength, and the wettability of the powder/binder system may be tailored according to the present system and method by adjusting the binder and/or metal-based powder chemistries. Moreover, the present method and system may quickly produce a three-dimensional object by providing the powder in bulk. Additionally, optimum sintering profile and environments may be designed for each metal type. Furthermore, the present system and method allow for the formation of an SFF three-dimensional metal object using a thermally actuated inkjet print head to dispense the jetted binder system, thereby reducing the overall maintenance of the system.

The preceding description has been presented only to illustrate and describe exemplary embodiments of the system and method. It is not intended to be exhaustive or to limit the system and method to any precise form disclosed. Many modifications and variations are possible in light of the above teaching. It is intended that the scope of the system and method be defined by the following claims.

What is claimed is:

1. A method for solid free-form fabrication of a three-dimensional metal object, comprising:
    depositing a particulate blend in a defined region, said particulate blend including a number of metal or metal alloy particulates and a peroxide; and
    selectively ink-jetting a binder system onto a predetermined area of said particulate blend to form a green part, wherein said binder system includes a water soluble monofunctional acrylate-based monomer, a water soluble difunctional acrylate-based monomer, an amine, and water.

2. The method of claim 1, further comprising removing said green part from said particulate blend.

3. The method of claim 1, further comprising performing a thermal binder burnout process on said green part.

4. The method of claim 3, wherein said thermal binder burnout process removes an organic content from said green part.

5. The method of claim 4, wherein said thermal binder burnout process comprises applying thermal energy to said green part.

6. The method of claim 4, further comprising performing a sintering process on said green part after said thermal binder burnout process.

7. The method of claim 6, wherein said sintering process comprises providing thermal energy to said green part sufficient to sinter said metal or metal alloy particulates.

8. The method of claim 1, wherein said binder system is selectively ink-jetted onto said particulate blend by one of a thermally actuated inkjet dispenser, a mechanically actuated inkjet dispenser, an elecfrostatically actuated inkjet dispenser, a magnetically actuated inkjet dispenser, a piezo-electrically actuated inkjet dispenser, or a continuous inkjet dispenser.

9. The method of claim 1, wherein said metal or metal alloy particulates comprises one of a stainless steel alloy, a magnetic alloy, a cobalt alloy, copper, a copper alloy, bronze, brass, tin, gold, iron, silver, platinum, palladium, iridium, titanium, tantalum, chromium alloys, an aluminum alloy, a magnesium alloy, an iron alloy, a nickel alloy, a silicon alloy, a zirconium alloy, a gold alloy, or metal coated ceramic particulates.

10. The method of claim 1, wherein said peroxide comprises one of a methyl ethyl ketone peroxide, a benzoyl peroxide, an acetylacetone peroxide, or a cumene hydroperoxide.

11. The method of claim 1, wherein said water soluble monofunctional acrylate-based monomer comprises one of an ester of acrylic or a methacrylic acid.

12. The method of claim 1, wherein said water soluble difunctional acrylate-based monomer comprises one of a 1,4-butanediol diacrylate, a 1,4-butanediol dimethacrylate, a 1,6-hexametlxylene glycol diacrylat; a neopentyl glycol dimethacrylate, a trimethylol propane trimethacrylate, a pentaerythritol triacrylate, a penta-erythritol trimethacrylate, a triethylene glycol triacrylate, a triethylene glycol tritnethacrylate, a urethane acrylate, a trimethylol propane triacrylate, or a urethane methacrylate.

13. The method of claim 1, wherein said amine comprises an aromatic amine.

14. The method of claim 13, wherein said aromatic amine comprises one of a dimethylamino benzoate, dihydroxyethyl-p-toluidine, dimethylaniline, a diethylaniline, or a dimethylacetamide.

15. The method of claim 1, wherein said particulate blend comprises 99% by weight 434 stainless steel metal-based powder and 1% benzoyl peroxide.

16. The method of claim 1, wherein said particulate blend comprises 95 to 99.5% 410 stainless steel metal-based powder and 1% benzoyl peroxide.

17. method of claim 1, wherein said binder system comprises:
    10 to 40% glycerol dimethacrylate;
    30 to 80% 2-hydroxy ethyl methacrylate (HYMA);
    10 to 20% de-ionized water; and
    0.1 to 5% N,N-dimethyl-4-ethylbenzoate.

18. The method of claim 1, wherein said binder system further comprises one of a surfactant, a humectant, or a co-solvent.

19. The method of claim 1, wherein said binder system comprises an ultraviolet (UV) curable binder system.

20. The method of claim 19, further comprising curing said green part by applying ultraviolet (UV) radiation on said green part.

21. A system for solid free-form fabrication of three-dimensional objects comprising:
    a particulate blend including metal or metal alloy particulates and a peroxide; and a jettable binder system including a water soluble monofunctional acrylate-based monomer, a water soluble difunctional acrylate-based monomer, an amine, and water;

wherein said jettable binder system is configured to react on contact with said peroxide and to selectively bind said metal or metal alloy particulates.

22. The system of claim 21, wherein said jettable binder system is disposed in said particulate blend.

23. The system of claim 22, wherein disposing said jettable binder system in said particulate blend initiates a radical polymerization of said water soluble monofunctional acrylate-based monomer and said water soluble difunctional acrylate-based monomer.

24. The system of claim 21, further comprising an ink-jet material dispenser configured to selectively jet said jettable binder system onto said particulate blend.

25. The system of claim 24, wherein said ink-jet material dispenser comprises one of a thermally actuated inkjet dispenser, a mechanically actuated inkjet dispenser, an electrostatically actuated inkjet dispenser, a magnetically actuated inkjet dispenser, a piezoelectrically actuated inkjet dispenser, or a continuous inkjet dispenser.

26. The system of claim 24, further comprising a substrate configured to support said particulate blend in a defined region, said defined region being configured with respect to said ink-jet material dispenser such that said jettable binder system, upon being jetted from said ink-jet material dispenser, contacts said particulate blend.

27. The system of claim 21, wherein said system is configured to apply multiple volumes of said jettable binder system such that each volume of said jettable binder system is bound to at least one adjacent volume.

28. The system of claim 21, further comprising a furnace configured to provide thermal energy to a green part sufficient to effect a thermal binder burnout reaction and a sintering reaction in said green part.

29. The system of claim 28, wherein said furnace is a programmable furnace configured to provide an atmosphere comprising one of oxidizing-air, reducing-hydrogen/nitrogen, dissociated ammonia, or pure hydrogen.

30. The system of claim 29, wherein said atmospheres may be controllably adjusted by said programmable furnace.

31. The system of claim 21, wherein said metal or metal alloy particulates comprises one of a stainless steel alloy, a magnetic alloy, a cobalt alloy, copper, a copper alloy, bronze, brass, tin, gold, iron, silver, platinum, palladium, iridium, titanium, tantalum, chromium alloys, an aluminum alloy, a magnesium alloy, an iron ahoy, a nickel alloy, a silicon alloy, a zirconium alloy, a gold alloy, or metal coated ceramic particulates.

32. The system of claim 21, wherein said peroxide comprises one of a methyl ethyl ketone peroxide, a benzoyl peroxide, an acetylacetone peroxide, or a cumene hydroperoxide.

33. The system of claim 21, wherein said water soluble monofunctional acrylate-based monomer comprises one of an ester of acrylic or a methacrylic acid.

34. The system of claim 21, wherein said water soluble difunctional acrylate-based monomer comprises one of a 1,4-butanediol diacrylate, a 1,4-butanediol dimethacrylate, a 1,6-hexamethylene glycol diacrylate, a neopentyl glycol dimethacrylate, a trimethylol propane trimethacrylate, a pentaerytbritol triacrylate, a penta-erytbritol trimethacrylate, a triethylene glycol triacrylate, a triethylene glycol trimethacrylate, a urethane acrylate, a trimethylol propane triacrylate, or a urethane methacrylate.

35. The system of claim 21, wherein said amine comprises an aromatic amine.

36. The system of claim 35, wherein said aromatic amine comprises one of a dimerhylamino benzoate, dihydroxyetbyl-p-toluidine dimethylaniline, a diethylaniline, or a dixnethylacetaxnide.

37. The system of claim 21, wherein said particulate blend comprises 99% by weight 434 stainless steel metal-based powder and 1% benzoyl peroxide.

38. The system of claim 21, wherein said particulate blend comprises 95 to 99.5% 410 stainless steel metal-based powder and 1% benzoyl peroxide.

39. The system of claim 21, wherein said binder system comprises:
10 to 40% glycerol dimethacrylate;
30 to 80% 2-hydroxy ethyl methacrylate (IEEMA);
10 to 20% de-ionized water; and
0.1 to 5% N,N-dimethyl-4-ethylbenzoate.

40. The system of claim 21, wherein said binder system further comprises one of a surfactant, a humectant, or a co-solvent.

41. The system of claim 21, wherein said binder system further comprises a UV initiator.

42. The system of claim 21, wherein said particulate blend comprises a UV initiator.

43. A system for solid free-form fabrication of three-dimensional objects comprising:
a particulate blend including metal or metal alloy particulates and a peroxide;
a jettable binder system including a water soluble monofunctional acrylate-based monomer, a water soluble difunctional acrylate-based monomer, an amine, and water; end
means for jetting said jettable binder;
wherein said jettable binder system is configured to react on contact with said peroxide and to selectively bind said metal or metal alloy particulates.

44. The system of claim 43, wherein said jettable binder system is disposed in said particulate blend.

45. The system of clam 43, further comprising means for applying thermal energy to said selectively bound metal or metal alloy particulates.

46. The system of claim 45, wherein said means for applying thermal energy is configured to perform a thermal binder burnout process and a sintering process on said selectively bound metal or metal alloy particulates.

47. The system of claim 45, further comprising means for regulating an environmental condition of said means for applying thermal energy.

48. The system of claim 47, wherein said means for regulating an environmental condition of said means for applying thermal energy is configured to provide an atmosphere comprising one of oxidizing-air, reducing-hydrogen/nitrogen, dissociated ammonia, or pure hydrogen.

49. The system of claim 48, wherein said atmospheres may be controllably adjusted by said means for applying thermal energy.

* * * * *

UNITED STATES PATENT AND TRADEMARK OFFICE
CERTIFICATE OF CORRECTION

PATENT NO. : 7,220,380 B2
APPLICATION NO. : 10/686263
DATED : May 22, 2007
INVENTOR(S) : Isaac Farr et al.

It is certified that error appears in the above-identified patent and that said Letters Patent is hereby corrected as shown below:

On the Title page, in field (75), under "Inventors", in column 1, line 3, delete "Philomath, OR" and insert -- Corvallis, OR --, therefor.

In column 12, line 10, in Claim 8, delete "elecfrostatically" and insert -- electrostatically --, therefor.

In column 12, line 32, in Claim 12, delete "hexametlxylene" and insert -- hexamethylene --, therefor.

In column 12, line 32, in Claim 12, delete "diacrylat;" and insert -- diacrylate, --, therefor.

In column 12, lines 35-36, in Claim 12, delete "tritnethacrylate" and insert -- trimethacrylate --, therefor.

In column 12, line 53, in Claim 17, delete "(HYMA)" and insert -- (HEMA) --, therefor.

In column 13, line 49, in Claim 31, delete "ahoy" and insert -- alloy --, therefor.

In column 14, line 1, in Claim 34, delete "pentaerytbritol" and insert -- pentaerythritol --, therefor.

In column 14, line 1, in Claim 34, delete "penta-erytbritol" and insert -- penta-erythritol --, therefor.

In column 14, line 8, in Claim 36, delete "dimerhylamino" and insert -- dimethylamino --, therefor.

In column 14, lines 8-9, in Claim 36, delete "dihydroxyetbyl-p-toluidine" and insert -- dihydroxyethyl-p-toluidine --, therefor.

In column 14, lines 9-10, in Claim 36, delete "dixnethylacetaxnide" and insert -- dimethylacetamide --, therefor.

UNITED STATES PATENT AND TRADEMARK OFFICE
CERTIFICATE OF CORRECTION

PATENT NO. : 7,220,380 B2
APPLICATION NO. : 10/686263
DATED : May 22, 2007
INVENTOR(S) : Isaac Farr et al.

It is certified that error appears in the above-identified patent and that said Letters Patent is hereby corrected as shown below:

In column 14, line 20, in Claim 39, delete "(IEEMA)" and insert -- (HEMA) --, therefor.

In column 14, line 37, in Claim 43, delete "end" and insert -- and --, therefor.

Signed and Sealed this

Nineteenth Day of May, 2009

JOHN DOLL
*Acting Director of the United States Patent and Trademark Office*